Aug. 5, 1958  E. J. ROBISHAW ET AL  2,845,725
TRACTION VEHICLE

Filed May 14, 1953  13 Sheets-Sheet 1

INVENTORS
Earl J. Robishaw
Robert E. Todd
BY Cushman, Darby & Cushman
ATTORNEYS

Aug. 5, 1958   E. J. ROBISHAW ET AL   2,845,725
TRACTION VEHICLE

Filed May 14, 1953                               13 Sheets-Sheet 4

INVENTORS
Earl J. Robishaw
Robert E. Todd
BY Cushman, Darby & Cushman
ATTORNEYS

Aug. 5, 1958 E. J. ROBISHAW ET AL 2,845,725
TRACTION VEHICLE
Filed May 14, 1953 13 Sheets-Sheet 5

INVENTORS
Earl J. Robishaw
Robert E. Todd
BY Cushman, Darby & Cushman
ATTORNEYS

Aug. 5, 1958 E. J. ROBISHAW ET AL 2,845,725
TRACTION VEHICLE
Filed May 14, 1953 13 Sheets-Sheet 6
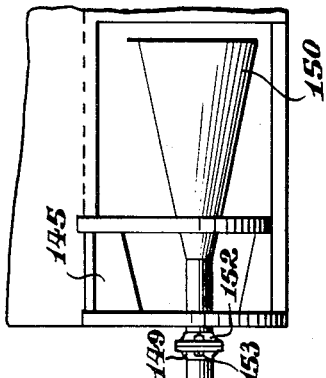
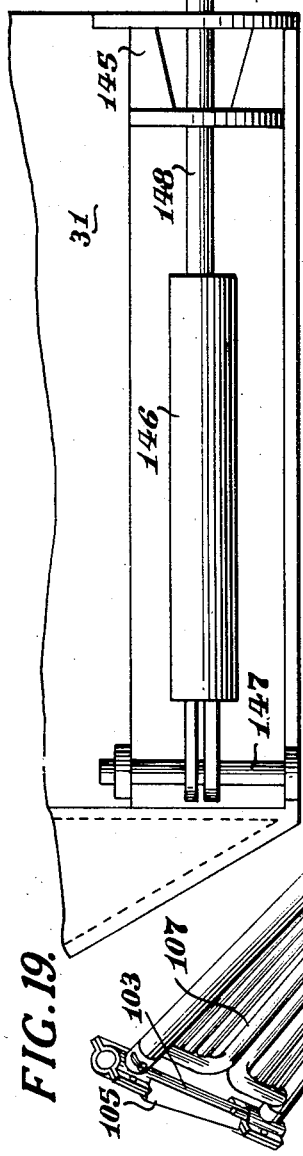
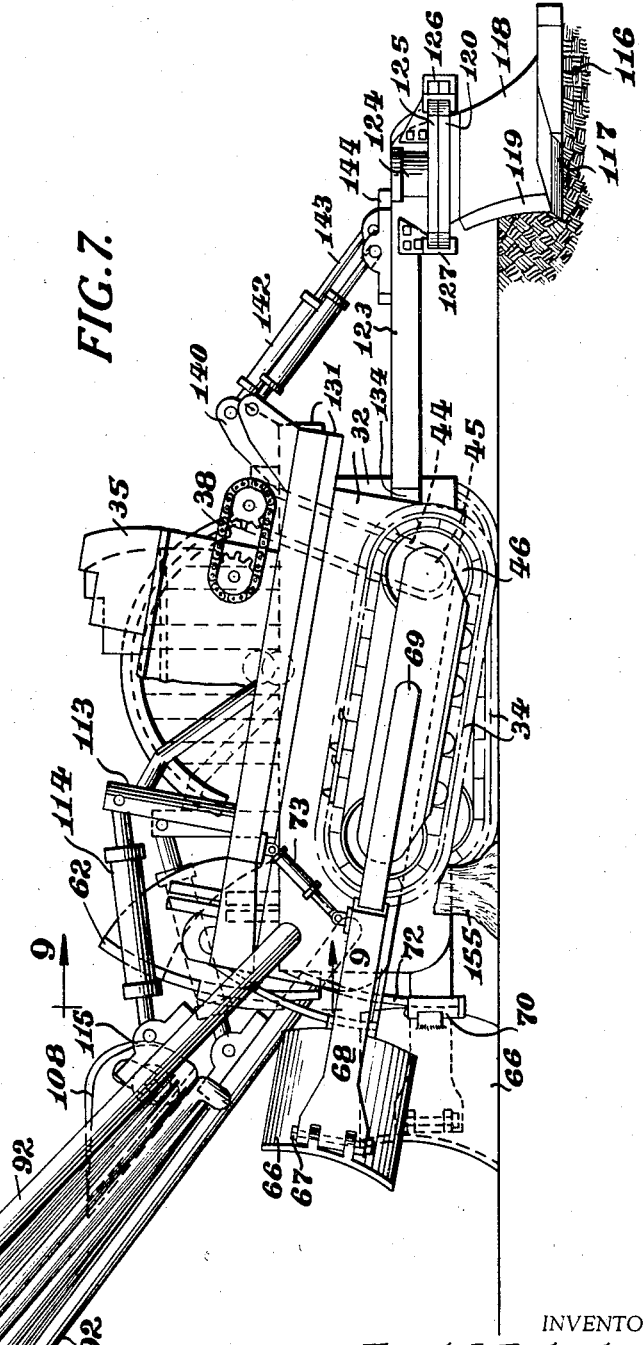
INVENTORS
Earl J. Robishaw
Robert E. Todd
BY Cushman, Darby & Cushman
ATTORNEYS Aug. 5, 1958 E. J. ROBISHAW ET AL 2,845,725
TRACTION VEHICLE
Filed May 14, 1953 13 Sheets-Sheet 7
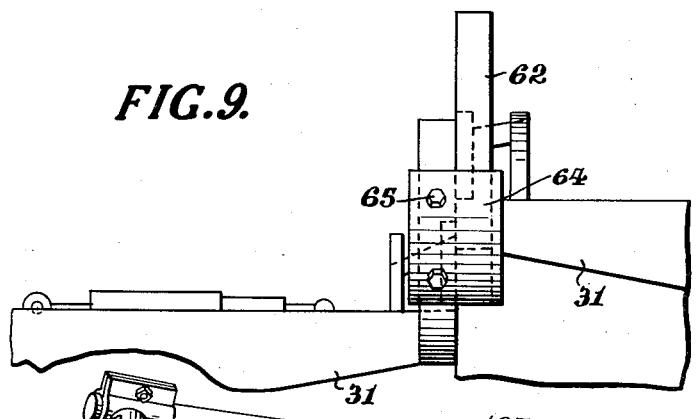
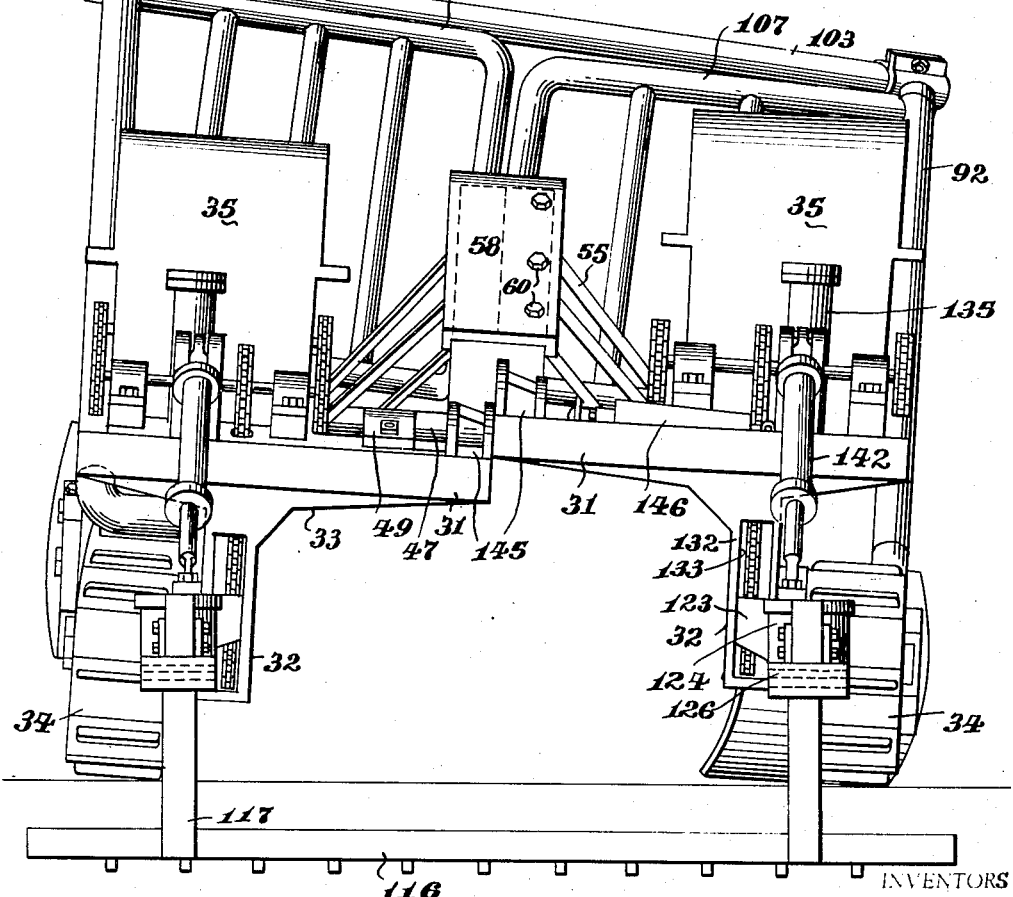
INVENTORS
Earl J. Robishaw
Robert E. Todd
BY Cushman, Darby & Cushman
ATTORNEYS

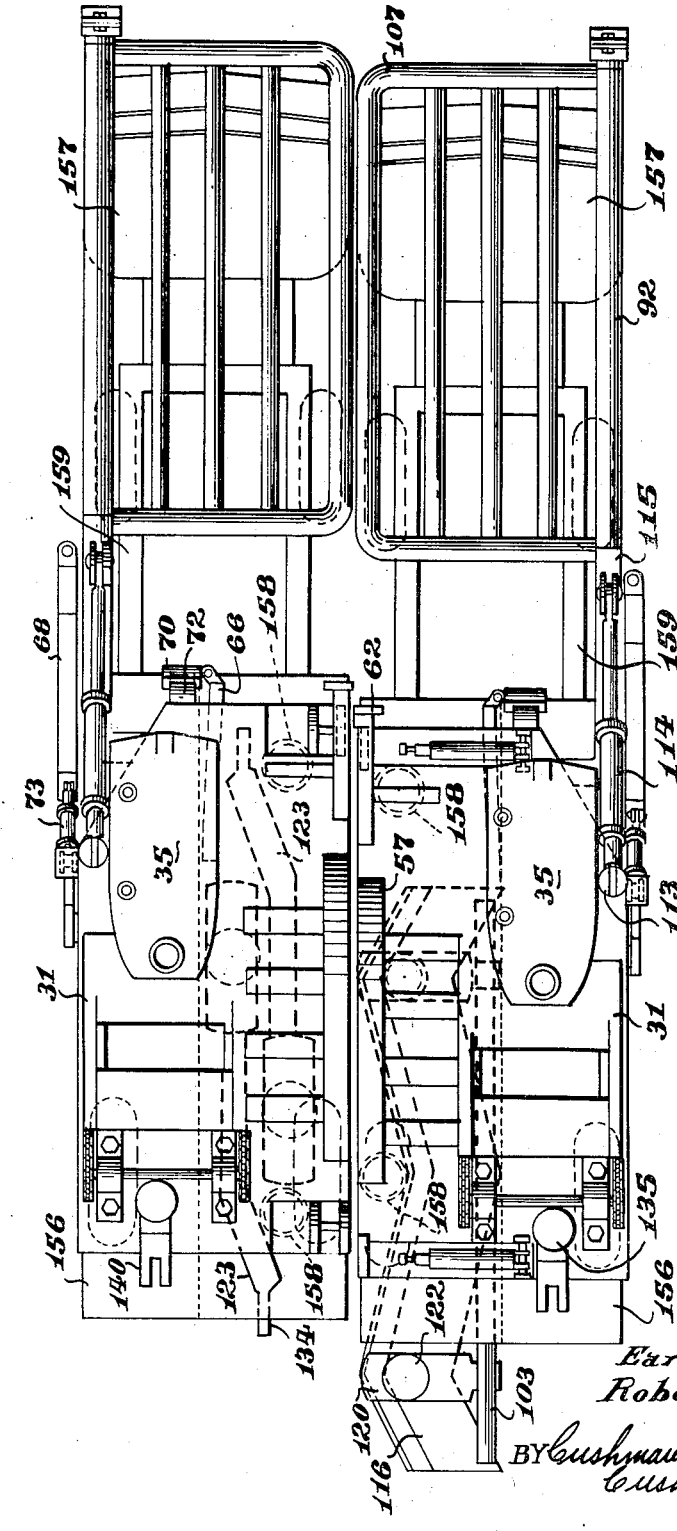

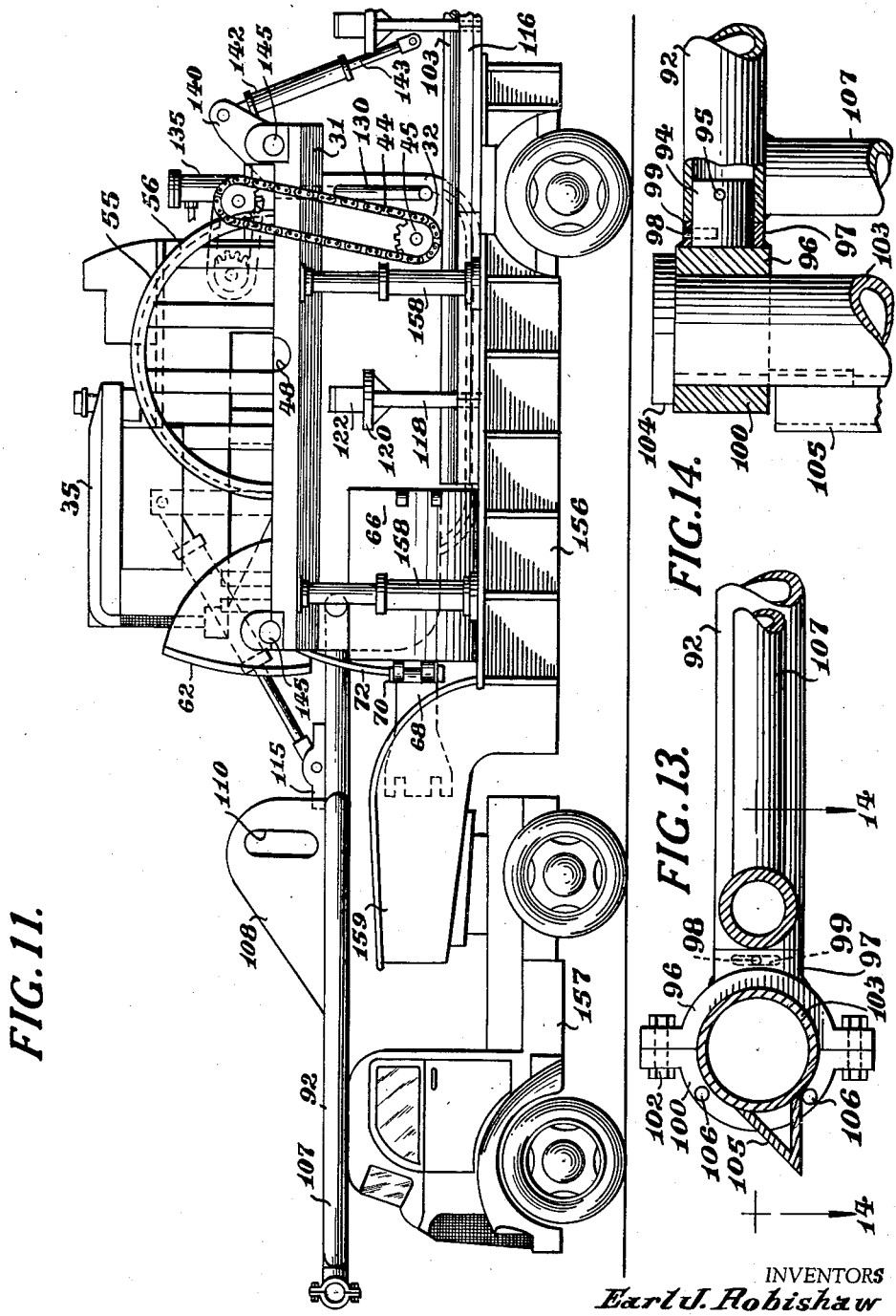

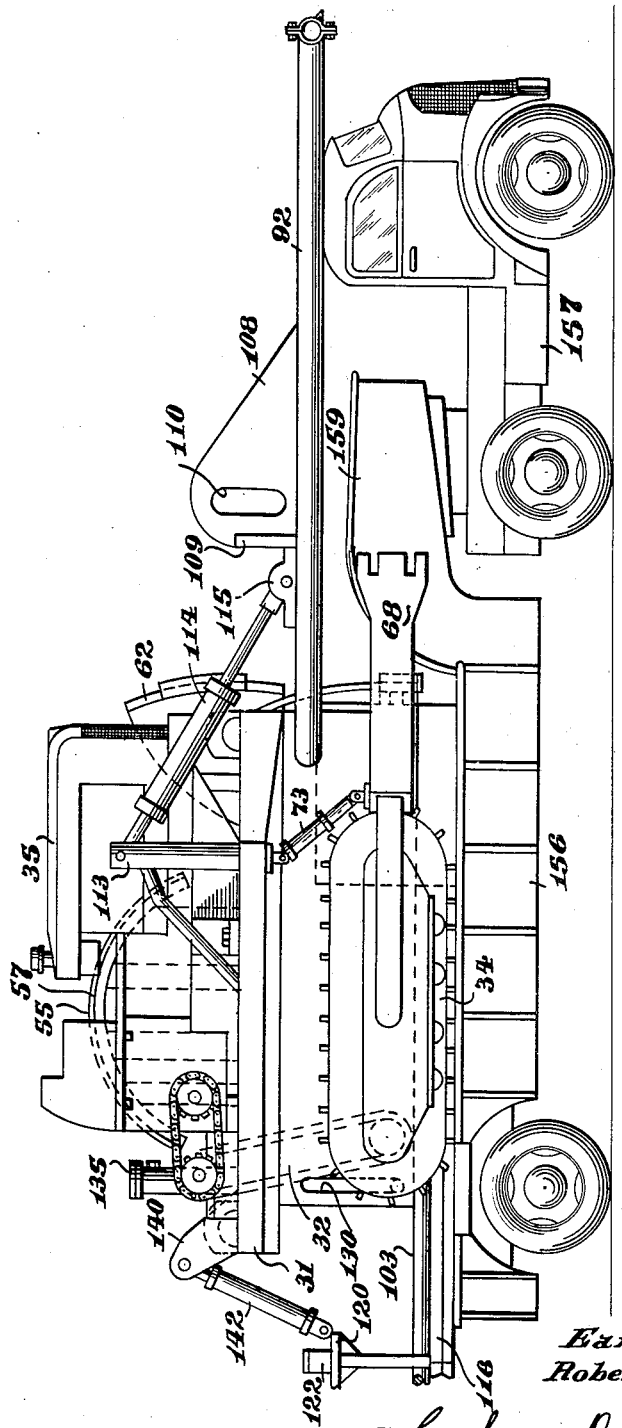

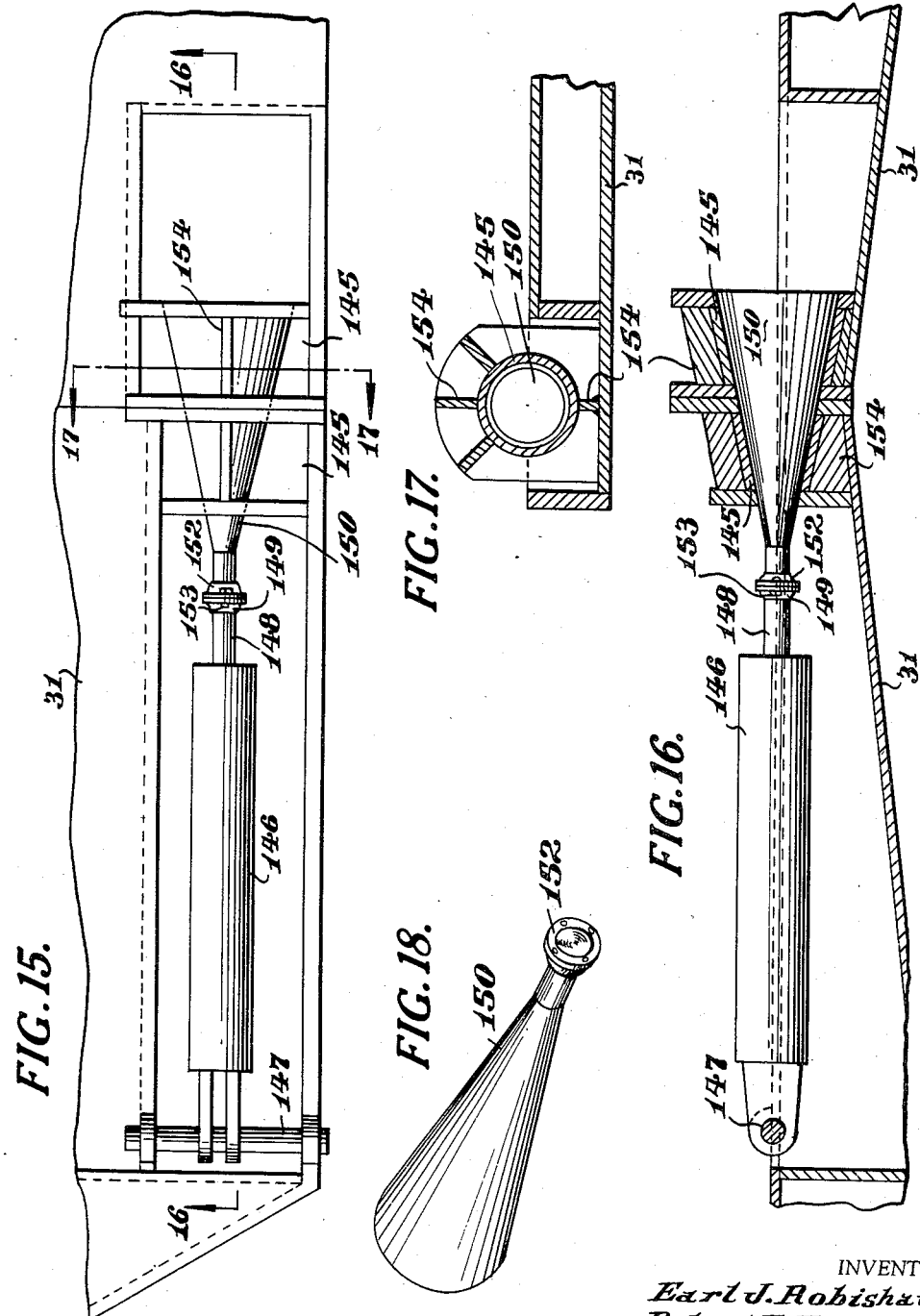

Aug. 5, 1958 E. J. ROBISHAW ET AL 2,845,725
TRACTION VEHICLE
Filed May 14, 1953 13 Sheets-Sheet 12
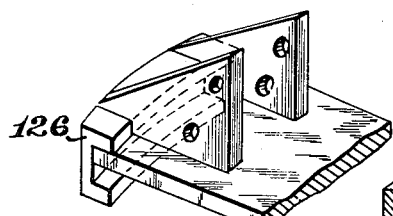
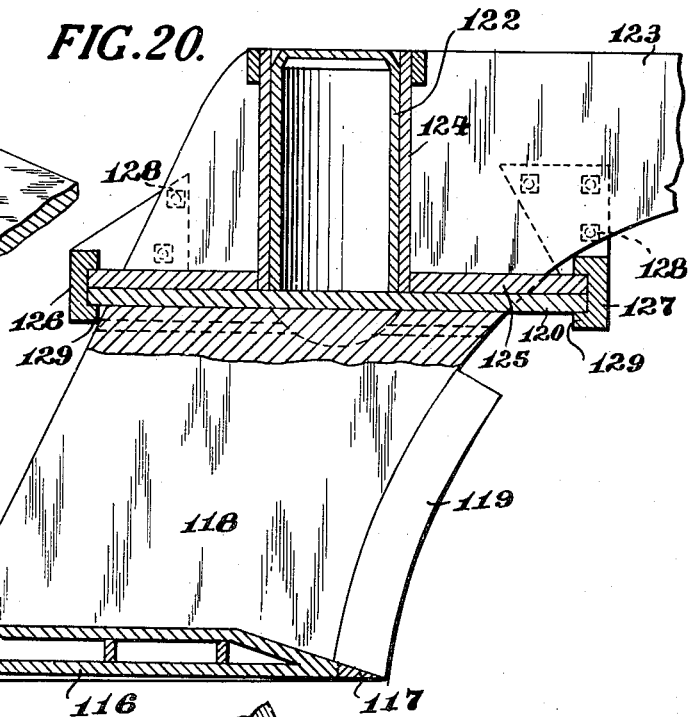
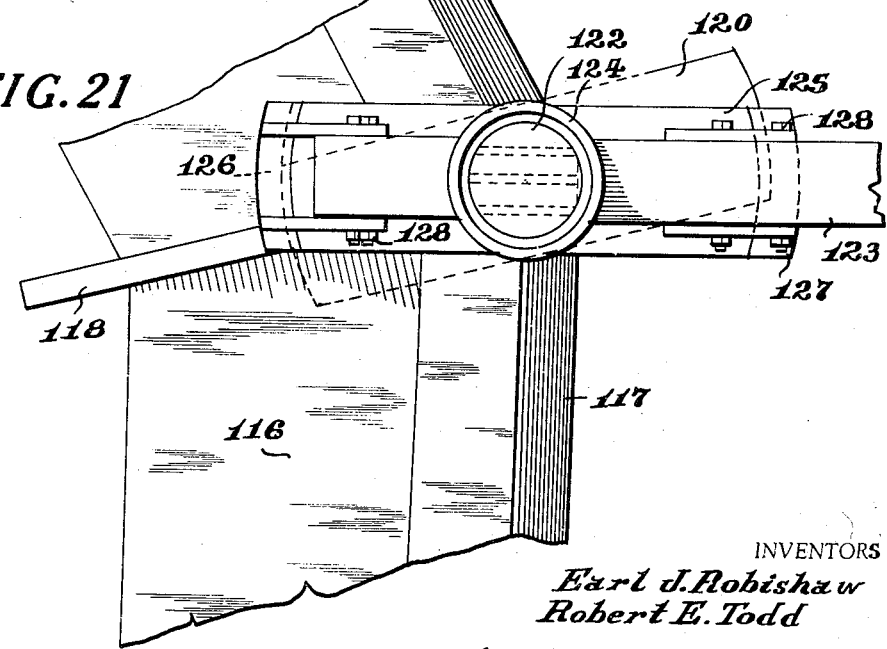
INVENTORS
Earl J. Robishaw
Robert E. Todd
BY Cushman, Darby & Cushman
ATTORNEYS Aug. 5, 1958 — E. J. ROBISHAW ET AL — 2,845,725
TRACTION VEHICLE
Filed May 14, 1953 — 13 Sheets-Sheet 13
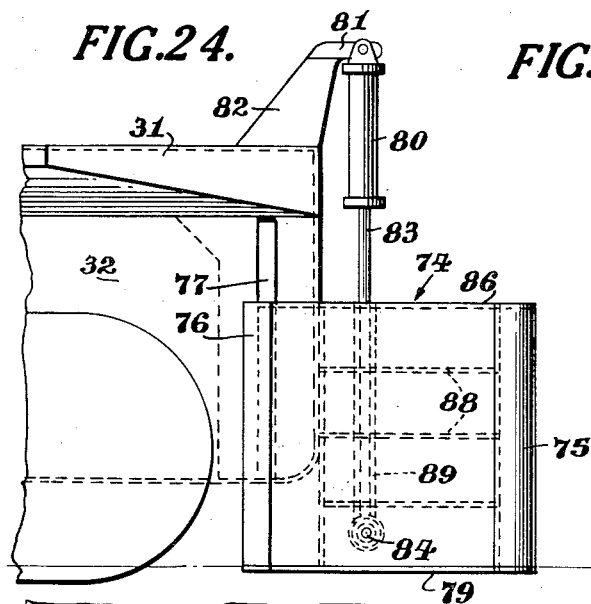
FIG. 24.
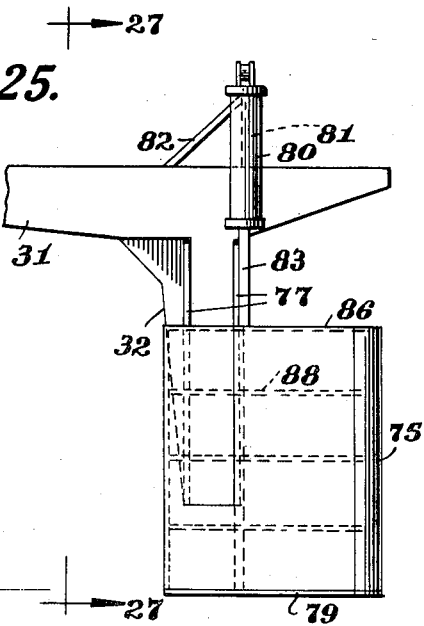
FIG. 25.
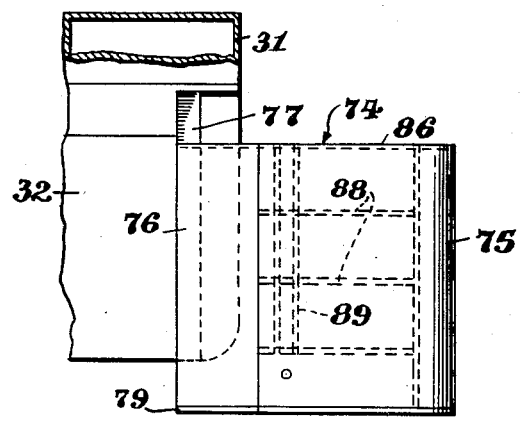
FIG. 26. FIG. 27.
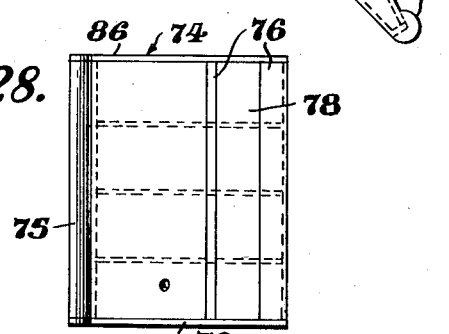
FIG. 28.
INVENTORS
Earl J. Robishaw
Robert E. Todd
BY Cushman, Darby & Cushman
ATTORNEYS

United States Patent Office 2,845,725
Patented Aug. 5, 1958

2,845,725

TRACTION VEHICLE

Earl J. Robishaw and Robert E. Todd, Houston, Tex.

Application May 14, 1953, Serial No. 355,014

29 Claims. (Cl. 37—2)

This invention relates to traction vehicles, and particularly to a traction vehicle designed and adapted for the clearing of land. Great areas of the land surface of the earth are unsuitable for agricultural purposes, even for grazing, due to brush infestation, forestration, and similar vegetable growths. With such cover, much of this land is quite worthless, and man, impelled by the constant necessity for more arable land, has for centuries labored to clear land and to maintain cleared land against the advance of the wilderness.

Hand grubbing is obviously no longer adequate to clear the vast areas of land required to feed the growing population of the world. More efficient devices and methods have been developed in recent years, for example power saws, bulldozers, chemical spraying and chaining. Chaining is practiced by dragging large heavy chains between crawler type tractors, by which method larger trees may be broken off or pulled over, and sizable areas of land partially cleared.

All of the methods and equipments previously devised share common disadvantages in that they do not effect a complete kill and removal of the vegetation to be cleared, and that they are to various degrees inefficient whereby the resultant cost of clearing land restricts and in some circumstances prohibits their use.

It is a primary object of the present invention to provide a land clearing machine of universal application, adapted with a equal facility and efficiency to rapidly clear land of brush, shrubs, trees or other vegetation adverse to agriculture, achieving a 100% kill and removal of the vegetation with outstanding economy of operation. A related object is to provide a land clearing machine which sub-surface plows the land in the course of its clearing operations, whereby the land is conditioned for agriculture and a sub-surface water reservoir is created.

Another object of the invention is to provide a traction vehicle of large size and power, incorporating unique features of flexibility permitting travel over obstacles of unusual size and form without stalling, loss of traction or related failure of function, to a degree considerably exceeding that inherent in conventional traction vehicles.

A further object of the invention is to provide a traction vehicle of large size readily separable into longitudinal sections or halves, whereby its overall size will not preclude transportation of the vehicle by conventional highway or railroad equipment. A related object is to provide, in a multi-section traction vehicle, means for aligning and drawing the sections together for assembly. Another related object is to provide in a fully flexible traction vehicle means for temporarily maintaining the vehicle rigid, for movement across clear level areas and for mere self-propelled transportation.

Still another object is to provide a land clearing machine adapted to arrange uprooted vegetation in piled rows, in which form the material may be readily handled by conventional equipment for removal or piling and burning.

Yet another object is to provide a land clearing machine including a pusher bar mounted forwardly thereof, blades disposed in front of the traction devices thereof and inwardly inclined to direct debris into a tunnel beneath the machine, a sub-surface plow engaged behind the machine, and individual means for vertically adjusting all of these associated elements in accordance with changing conditions of operation.

A further object is to provide in combination with a traction vehicle a sub-surface plow of unique design and configuration, novel means for flexibly and pivotally engaging the plow to the vehicle, and distinct means for lifting and holding the plow in inoperative transport position.

Further objects and advantages of the invention will be in part obvious and in part pointed out hereinafter.

The invention and the novel features thereof may best be made clear from the following description and the accompanying drawings, in which:

Figure 7 is a side elevational view corresponding to Figure 1, but illustrating the overall flexibility of the machine;

Figure 8 is a rear elevational view corresponding to Figure 4, further illustrating the flexing action of the machine;

Figure 9 is a fragmentary front elevational view showing the front arc supports in relatively displaced position;

Figure 10 is a plan view of the machine separated longitudinally into two sections, each of which is mounted on a conventional tractor-trailer unit for transport;

Figure 11 is an inside elevational view of the right-hand section of the machine, or lower section as viewed in Figure 10, mounted on a tractor-trailer unit;

Figure 12 is an outside elevational view of the right-hand section of the machine mounted on the tractor-trailer unit;

Figure 13 is a sectional view on an enlarged scale taken on the line 13—13 of Figure 2, showing details of the pusher bar mounting;

Figure 14 is a sectional view taken on the line 14—14 of Figure 13;

Figure 15 is a fragmentary plan view, on enlarged scale, of one of the draw members and associated elements of the device, in position locking the vehicle frames against relative movement;

Figure 16 is a sectional view taken on the line 16—16 of Figure 15;

Figure 17 is a sectional view taken on the line 17—17 of Figure 15;

Figure 18 is a perspective view of a preferred form of draw member;

Figure 19 is a fragmentary plan view corresponding to Figure 15, but showing the draw member and associated elements in position to align and draw the vehicle frames together for assembly;

Figure 20 is a vertical sectional view, on enlarged scale, taken on the line 20—20 of Figure 2, showing details of the sub-surface plow and the vertical pivot means by which it is engaged to the drag arms;

Figure 21 is an enlarged fragmentary plan view of the plow-drag arm engagement, illustrating the pivotal action thereof;

Figure 22 is an enlarged fragmentary perspective view of the slide bracket provided at the outer end of each drag arm, to facilitate pivotal movement of the plow;

Figure 23 is a sectional view of the pusher booms and pressure plates, taken on the line 23—23 of Figure 1, showing details of the flexible connection between the pressure plates;

Figure 24 is a side elevational view of a modified form of inclined blade, together with means for its elevation;

Figure 25 is a front elevational view of a blade corresponding to that of Figure 24;

Figure 26 is a top plan view of the blades of Figures 24 and 25, partly broken away to show the slidable mounting thereof;

Figure 27 is a sectional view taken on the line 27—27 of Figure 25, and

Figure 28 is a rear elevational view of the alternative blade, illustrating the mounting structure thereof.

Figure 5:
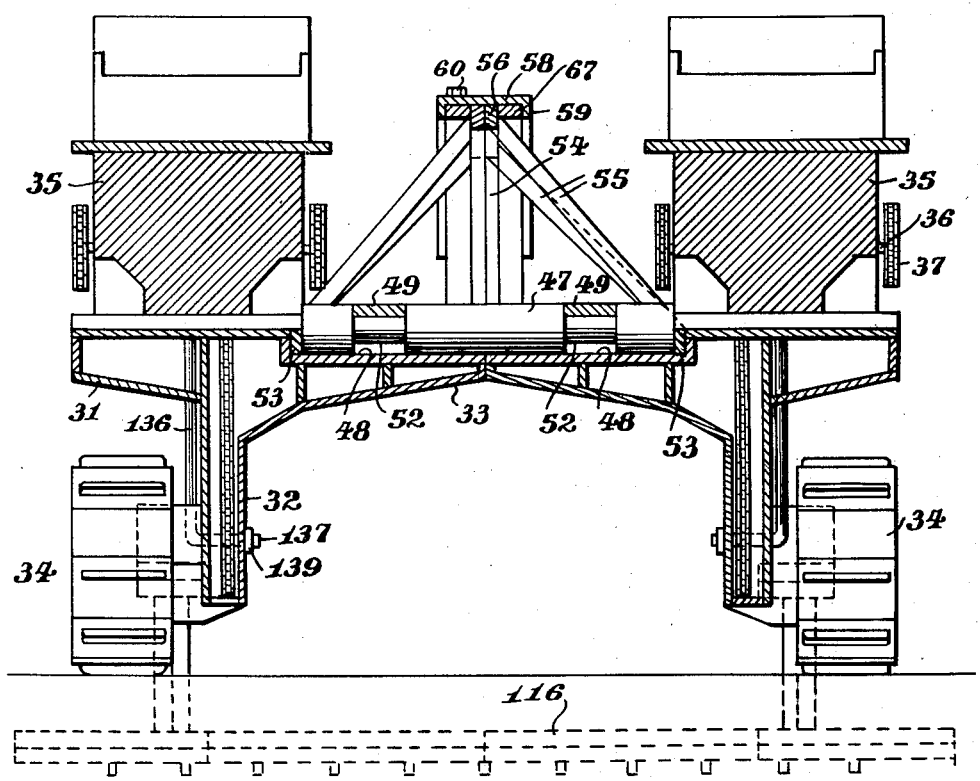
Figure 5 is a vertical sectional view taken on the line 5—5 of Figure 1, showing the transverse pivot member of the machine and its mounting.

Referring to the drawings in detail, in Figures 1 to 4 is shown a preferred embodiment of the invention, comprising a traction vehicle including two frames indicated generally as 30 disposed side by side, each frame including a generally horizontal portion 31 and a longitudinally extended generally vertical portion 32 extending downwardly therefrom. As best illustrated in Figure 5, the frames 30 are preferably of sturdy box design, constructed and assembled by welding. The two frames together define a tunnel 33 below the horizontal portions 31 and between the vertical portions 32 thereof, see Figure 3. Conveniently mounted on the outside of the vertical portion 32 and supporting each frame is a conventional traction device 34, preferably of the continuous tread variety. More than one traction device may be used with each frame. An individual power unit 35 may be mounted on each frame, on the frame portion 31 thereof substantially above the traction device 34 supporting the frame. Since total power requirements of the machine are high, the power units illustrated are diesel engines of large size.

Each power unit 35 is connected in driving engagement to the traction device 34 of the same frame. The driving engagement may conveniently and efficiently be effected from each power take-off 36 through sprockets 37, chains 38, and the sprockets 39 engaged to the ends of a drive shaft 40. Each drive shaft 40 is suitably mounted on a frame portion 31 by means of heavy-duty bearings 42, and mounts another sprocket 43 which is engaged by chain 44 to a sprocket 45 fixedly engaged to the driving wheel 46 of the traction device. As will be readily understood, the power units 35 include conventional transmissions and controls, so that each may drive the associated traction device at a variety of speeds, and in both forward and reverse direction. The traction devices of the vehicle being independently powered and controlled, the vehicle may be freely turned and maneuvered. Obviously, one of the power units may be remotely controlled, so that a single operator stationed at one may operate both power units, either in unison or differentially.

As an outstanding feature of the invention, the frames 30 are not rigidly joined, but joined merely for relative pivotal movement about a transverse pivot axis. For this purpose, a transverse pivot member 47 is disposed across the frames, at a level coinciding substantially with the upper surface of frame portions 31 and considerably above that of the traction devices 34. The pivot member may be suitably supported in aligned bearing wells 48 of frame portions 31, and retained therein by bearing brackets 49 disposed over the pivot member and detachably secured to the frames as by bolts 50. To restrain the pivot member from movement in axial direction it may be provided with reduced portions 52, and the bearing brackets 49 adapted to engage these reduced portions, as best shown in Figure 5. Thrust plates 53 may also be provided at the inner ends of bearing wells 48, to further retain the pivot member in desired position.

Since the traction vehicle is large and heavy, and adapted for severe duty, the engagement between the vehicle frames must obviously be capable of withstanding great stress. To keep the diameter and weight of pivot member 47 within reasonable limits, it is assisted in its function by an arc support 54 mounted on each frame portion 31 and supported by suitable braces 55. The arc supports are arcuate and disposed concentrically with the axis of pivot member 47, the outer faces 56 thereof being substantially coplanar with the inner faces of frame portions 31, so that when the frame portions are duly aligned in adjacency the arc supports will abut each other as shown in Figure 5. Each arc support is provided with an outwardly extending peripheral flange 57, and an arcuate cap member 58 adapted to enclose the radially outward surfaces of the arc supports and arc support flanges 57 may be provided. The cap member 58 is provided with inwardly extending flanges 59, and adapted for detachable engagement to one of the arc support flanges 57 as by bolts 60. As will be readily understood, when engaged to one arc support the cap member and its flanges 59 will be effective to slidably retain the arc supports 54 together.

Desirably, an additional arc support 62 is provided at the front inner corner of each frame, to assist arc supports 54 and pivot member 47 in maintaining the pivotal engagement of the frames. The arc supports 62 are suitably braced by braces 63, and an arcuate cap member 64 is adapted to be detachably fixed to the outer face of one arc support 62, as by bolts 65, the cap member 64 being flanged in a manner corresponding to cap member 58 whereby when engaged to one it will maintain the front arc supports in sliding engagement, that is will prevent lateral separation thereof. Arc supports 62 are also arcuate and concentric about the axis of pivot member 47, the radius thereof, however, being considerably greater. The arc supports 62 are particularly adapted to prevent lateral separation of the front ends of the frames, where the tendency to separate may be greatest under some conditions of operation.

The frames are joined, then, primarily by cap members 58 and 64, and by bearing brackets or similar elements associated with the transversely extending pivot member 47. Each of these connections is, of course, not rigid, but slidably pivotal about the axis of pivot member 47, so that while the frames are restrained from lateral separation they may freely pivot with respect to each other about the pivot member. The outstanding advantages of this pivotal engagement will be fully described hereinafter.

To direct vegetation and debris into the tunnel 33 of the machine, an inwardly inclined blade 66 is mounted on the front of each frame in the path of the traction device thereof. Desirably, provision is made to elevate each blade 66 from normal ground-engaging position, when required by conditions of operation. To this end, the blade may be detachably secured by a pin 67 to the outer end of an arm 68, which arm is pivotally engaged outside the traction device 34 by a transverse pivot 69. The inner trailing edge of each blade may be pivotally engaged on a substantially vertical axis to a carrier 70, which in turn is slidably engaged to an arcuate guide 72 affixed to the forward end of the frame, the guide being concentric with the axis of pivot 69. To elevate each arm and the associated blade, a hydraulic cylinder 73 may extend from the underside of frame portion 31 to a suitable point of engagement on arm 68, the hydraulic cylinder being operative to swing the arm 68 upwardly toward the frame about the axis of pivot 69, whereupon the associated blade 66 and its carrier 70 will be correspondingly elevated with respect to the frame, and to the ground.

Alternative blade structures and mountings are illustrated in Figures 24 to 28. As there shown, each blade may also comprise a built-up box structure 74, provided at its outer vertical edge with a rounded impact strip 75. Each blade is provided at its rear side with a pair of laterally spaced rearwardly extending tongues 76, adapted to engage behind and ride on guide bars 77 affixed to the outer side surfaces of the frame portion 32. As best shown in Figure 26, the rear side of blade 74 is outlined by a U-shaped member 78, which strengthens the structure and particularly supports the tongues 76 extending therebeyond.

Each blade 74 is provided with a wear plate 79 on its bottom surface, by which it is adapted to ride on and over the surface of the ground. Each blade 74 may move vertically with respect to its guide bars 77, and a hydraulic cylinder 80 is provided to elevate the blade when desired to the limit of its permitted travel. The hydraulic cylinder 80 depends vertically from a suitably designed bracket 81 mounted on the forward end of the frame, and braced by member 82, and is provided with an elongated rod 83 which extends substantially through the blade, being secured thereto at a point adjacent the bottom thereof by a pin 84. The upper surface 86 of the blade is apertured at 87 for the piston rod, and the internal horizontal plates 88 of the blade are apertured in alignment for the same purpose. A vertically disposed tube 89 may connect these apertures. The piston rod extending substantially through the blade in cooperation with its enclosing tube 89 serves to assist in maintaining proper vertical disposition of the blade.

Adjacent the front end of each frame portion 32, a boom 92 is pivotally mounted on a transverse axis and extends forwardly therefrom. As well illustrated in Figure 3, the inner end of the boom is formed into an inwardly turned pivot section 93, which extends into and is suitably journaled for pivotal movement by frame portion 32. At the outer end of each boom 92 (see Figures 13 and 14) a cylinder bearing 94 is suitably mounted, as by pin 95, and projects outwardly therefrom. The cylinder bearing 94 supports a semi-circular housing 96, said housing including a sleeve 97 extending rearwardly therefrom and enclosing the outer end of bearing 94. Limited rotation of housing 96 relative to the axis of the boom is permitted by reason of the connection therebetween, the bearing 94 being provided with a pin 98 extending therefrom and engaging a slot 99 in bearing sleeve 97.

An opposed semi-circular housing 100 is provided with each housing 96, detachably secured thereto as by bolts 102. The housing pairs 96 and 100 are adapted to enclose and support therebetween a transverse pusher bar 103, provided with end flanges 104 to prevent lateral relative movement when in place. Desirably, the pusher bar is of circular cross section, and may be provided on its forward surface with an extended knife edge 105. The pusher bar and its knife edge may be freely rotatable within the housings, but stop members 106 (Figure 13) are usually provided to engage the knife edge and limit the rotative movement of the pusher bar, whereby the knife edge may be confined to frontal position.

Extending inwardly from each boom 92 is a pressure plate 107, which may be solid or of openwork construction as shown. The pressure plates extend into substantial adjacency, and from the inner edge of each a guide plate 108 extends vertically, and preferably upwardly. As shown in Figure 23, the guide plates may be suitably braced by braces 109. Each guide plate 108 is slotted at 110 in direction perpendicular to the plane of the associated pressure plate, and a flanged pin 112 extends through the slots of the guide plates and limits their relative movement.

Suitable means are provided to pivotally elevate the booms 92 and the structure associated therewith. As illustrated, such means may comprise a vertical brace 113 suitably mounted on the upper side of each frame portion 31, and a hydraulic cylinder 114 pivotally engaged to the upper end of each brace with its rod similarly engaged pivotally to a pad 115 on the corresponding boom 92. The cylinders 114 may be actuated in unison, to elevate the booms 92 and the associated pusher structure as a unit.

Figure 2:
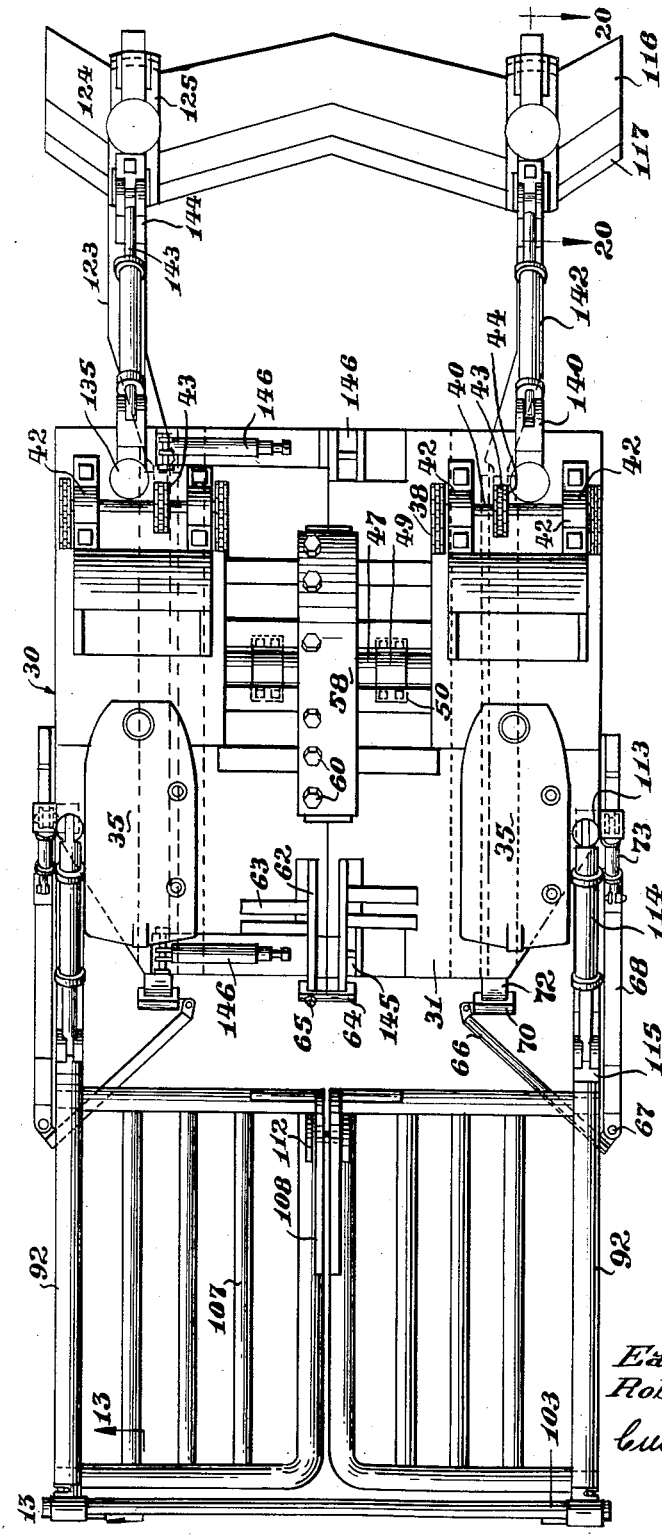
Figure 2 is a top plan view of the device of Figure 1.
Figure 3:
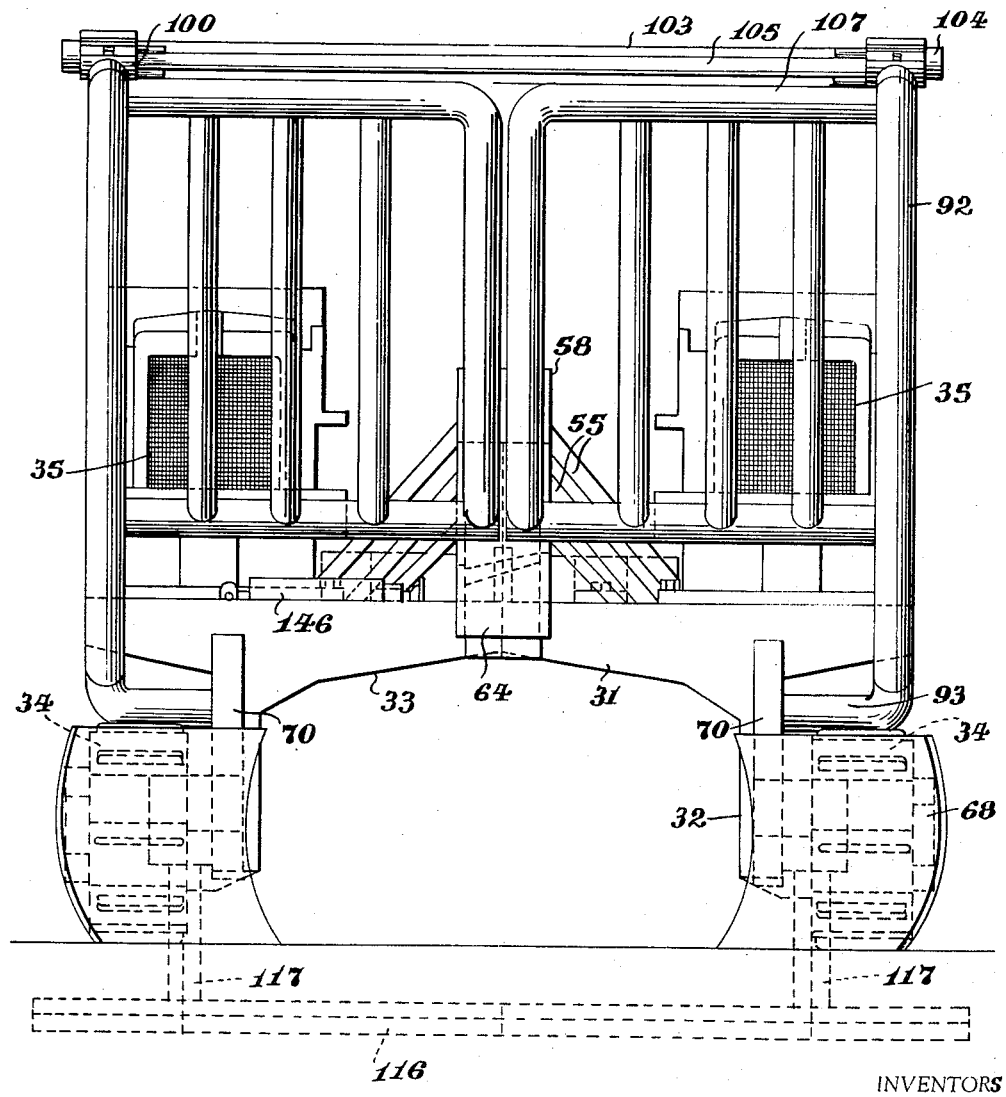
Figure 3 is a front elevational view of the device of Figure 1.
Figure 4:
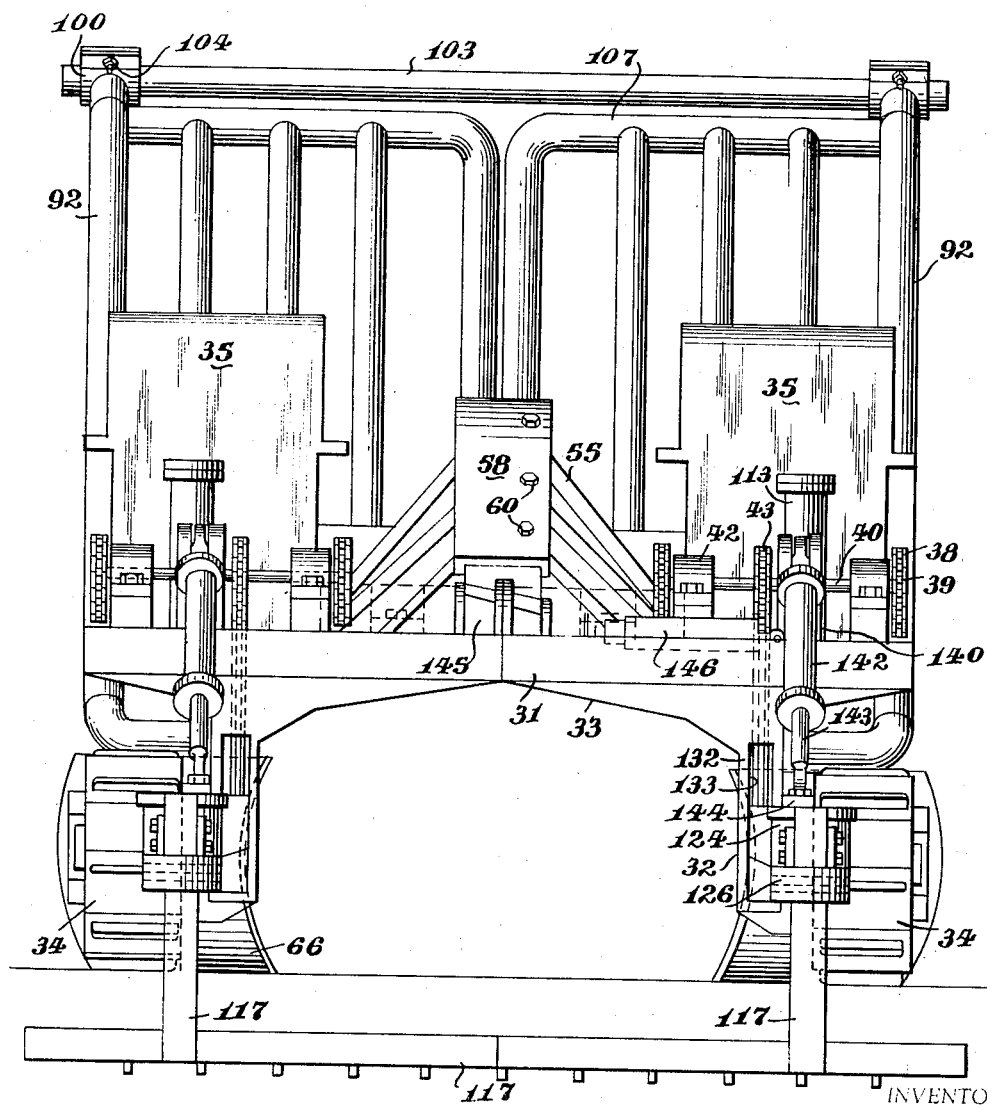
Figure 4 is a rear elevational view of the device of Figure 1.

A novel sub-surface plow is engaged to the rear end of the vehicle in uniquely flexible fashion. The plow 116 is of flexible truss or box frame construction, and provided with a sharp leading edge member 117 (see Figure 20). The overall width of the plow preferably exceeds that of the vehicle proper, as shown in Figure 2. From suitably spaced points between the ends of the plow, two standards 118 project upwardly therefrom, the standards also being provided with sharp leading edge members 119. As seen in Figure 2, the plow is of generally W-configuration in plan and disposed with bottom corners forward, the standards being aligned with the leading corner points of the plow and the plow leading edge being rearwardly inclined on both sides of each standard.

Atop each standard 118 is a horizontal bearing plate 120, from which a vertical pivot 122 extends upwardly. The plow is engaged to the vehicle frames by a pair of drag arms 123. Each drag arm extends rearwardly from one frame and is formed at its outer end (see Figure 20) into a vertically disposed cylindrical housing 124 adapted to enclose and pivotally engage a plow pivot 122. A bearing plate 125 extends horizontally forwardly and rearwardly from the lower end of the cylindrical housing 124, the bearing plate conforming generally in shape and dimensions to the bearing plate 120 of the plow standard.

The ends of bearing plates 120 and 125 may be shaped in the form of arcs about the axis of pivot 122, and arc supports 126 and 127 may be detachably engaged to each drag arm by bolts 128, the arc supports being interiorly arcuate to correspond to the ends of the bearing plates. As shown in Figure 20, the arc supports are provided with inwardly extending flanges 129, whereby they are adapted to retain the bearing plates in pivotally sliding engagement and to restrain them from vertical separation.

Figure 1:
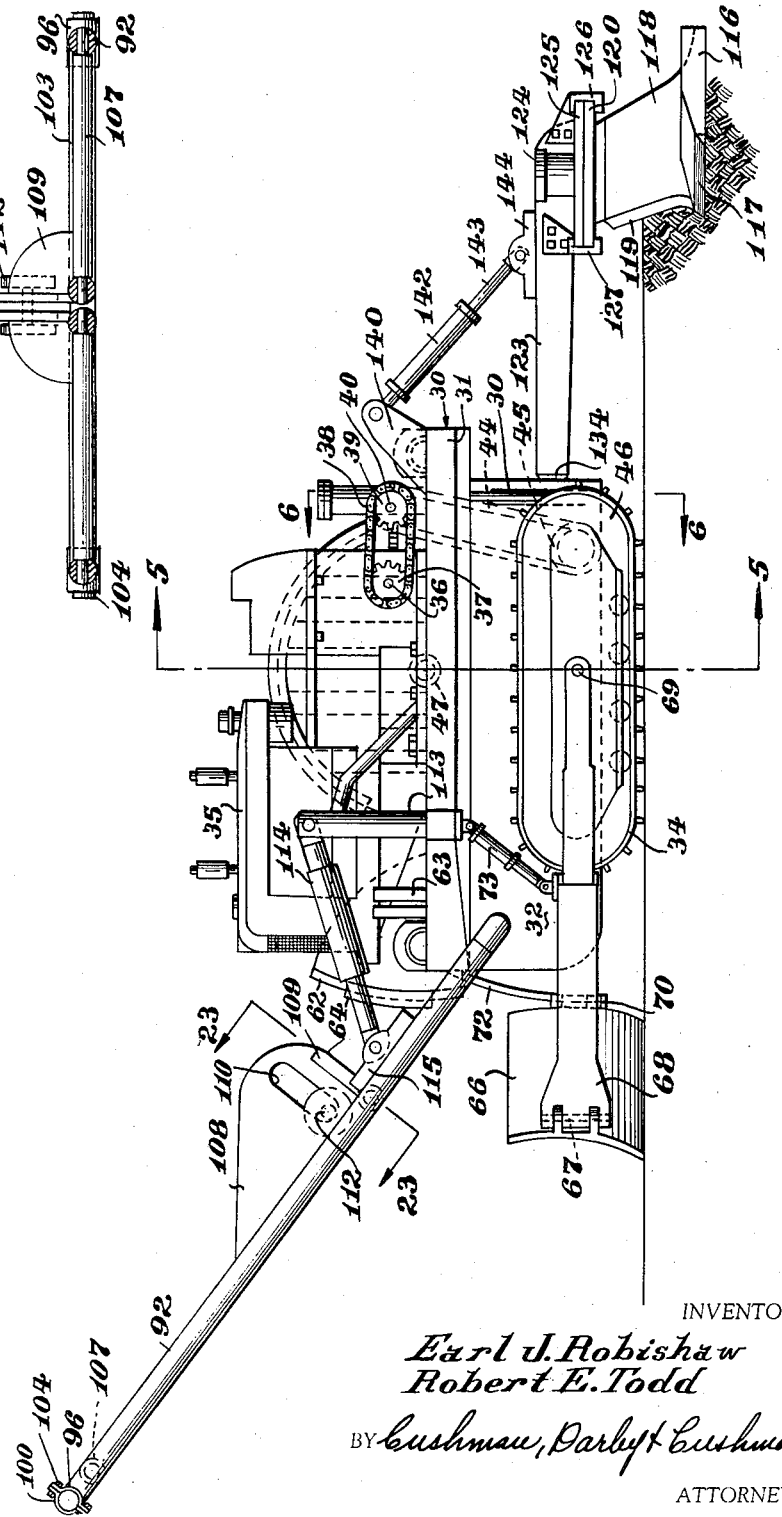
Figure 1 is a side elevational view of a preferred embodiment of the invention, in the form of a land clearing machine.
Figure 6:
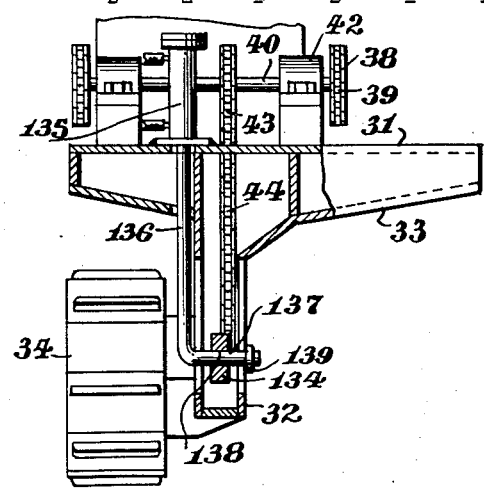
Figure 6 is a vertical sectional view taken on the line 6—6 of Figure 1, showing details of mechanism for adjusting the level of the sub-surface plow.

The forward ends of the drag arms are engaged to the vehicle frames in flexible, vertically adjustable manner. Referring to Figures 1, 5 and 6, each frame portion 32 adjacent its rear end is provided with a vertical slot 130 extending transversely therethrough, and the rear surface 132 of each frame portion 32 has a vertically disposed elongated opening 133 into which the forward end of the drag arm may extend, whereby it may be received inside the frame portion 32 and extend beyond the slot 130. The inner end of each drag arm is formed into a slide pad 134, which fits loosely within opening 133.

Substantially above the rear end of each frame portion 32, and mounted on the associated frame portion 31, is provided a vertically disposed hydraulic cylinder 135 having an elongated rod 136 which extends downwardly alongside the frame portion 32 (see Figure 6). The cylinder rod 136 terminates in an inwardly turned bearing portion 137, adapted to extend inwardly through the adjacent frame slot 130 and through the engagement opening 138 provided therefor in slide pad 134 of the drag arm. Rod portion 137, then, constitutes a horizontal pivotal engagement for the drag arm, and the structure when assembled as described is retained in proper relationship by a suitable nut 139 affixed to the end of the rod. As will be understood, the inner ends of the drag arms may be vertically adjusted with respect to the frames by means of cylinders 135 and their rods 136, the frame slots 130 serving to a degree as guides for this purpose. Lateral swinging movement of the drag arms relative to the frames may be permitted by making the frame slots 130 somewhat oversize relative to the rod bearing portions 137, whereby the rod portions 137 may pivot to a limited extent about the vertical axes of their rods and cylinders. The loose fit of slide pads 134 within the frame openings 132 is also adapted to accommodate lateral swinging movement of the drag arms.

As indicated, cylinders 135 constitute means for adjusting the relative vertical position of the inner ends of the drag arms. Further means may be provided to pivotally elevate the drag arms and plow to inoperative transport position. For example, a bracket 140 may be provided atop the rear end of each frame portion 31, and a hydraulic cylinder 142 pivotally engaged thereto, the rod 143 of the cylinder being similarly pivotally engaged to a pad 144 associated with the corresponding drag arm.

As will be evident from the foregoing and explained in detail hereinafter, the exemplary embodiment of the invention is readily separable into two longitudinal halves or sections, to permit transportation thereof on conventional highway or railroad equipment. This feature is intimately related to the basic design of the vehicle in two distinct frames 30. To assist in alignment and assembly of the frames, each frame portion 31 is provided adjacent its inner edge with transversely disposed tapered or preferably conical housings 145, the tapered housings of each frame being correspondingly positioned longitudinally for registry when the frames are in proper position for assembly. The conical housings of the respective frames (see Figures 15 to 19) are differently sized, representing adjoining trans-axial sections of a common cone. Adjacent each of the smaller of the conical housings is disposed a transversely mounted hydraulic cylinder 146, one end of which is engaged at 147 to the frame. The outer end of the cylinder rod 148 is provided with a universal or flexible joint member 149. For use with cylinders 146 and the housings 145, draw members 150 of conical or otherwise tapered form are provided, the smaller end of each draw member mounting a joint member 152 corresponding to and adapted for cooperation with the joint member 149 of the cylinder rod 148. That is, the joint members 149 and 152 may be assembled by bolts 153 to constitute a flexible joint. Necessarily, the conical housings 145 are sturdily mounted in the frames, and braced by a plurality of radial braces 154.

Operation and utilization of the invention will now be described in detail. When completely assembled as illustrated in Figures 1 to 4, the vehicle is adapted for the clearing of land by forward movement under its own power. By means of hydraulic cylinders 114, booms 92 and the pusher bar 103 extending therebetween may be pivotally adjusted to desired angular position relative to the frames in accordance with the size and type of vegetation to be cleared. In the machine illustrated, for example, the pusher bar may be adjusted within a range of from 6 to 18 feet above the ground. As the vehicle advances, the pusher bar and its knife edge 105 engage trees, mesquite and other vegetation of comparable height, and push it forwardly until uprooted or broken off. Once engaged, knife edge 105 may turn until it encounters stop members 106, but will thereafter tend to lift engaged objects from the soil. The pusher bar being normally carried high above ground level, a considerable lever action against upright vegetation is effected.

The pressure plates 107 associated with booms 92 are adapted to knock down, break off and otherwise compress downwardly branches and other extensions of the vegetation, as well as low bushes and the like which pass under the pusher bar, so that they will readily pass into and through the tunnel 33. In the exemplary embodiment, the tunnel may be 6 feet high and 9 feet wide, adequate to easily pass over trees of diameter up to and including 4 feet. The blades 66 or 74 are inwardly inclined and similarly adapted to direct lateral extensions of the vegetation uprooted and low plants in the path of the traction device inwardly into the tunnel. Accordingly, with the advance of the machine the vegetation in its path is progressively knocked down, broken off, uprooted or otherwise leveled, and arranged in a row of cross-sectional dimensions approximating those of the tunnel. This row of debris may be readily pushed aside, piled for burning or otherwise handled by conventional equipment.

Immediately after passage of the vehicle proper, the sub-surface plow 116 severs tap roots and other underground extensions of the vegetation, leaving stumps, boles and the like completely detached from the soil, and completing a 100% and permanent kill of the vegetation. As will be evident, the plow in passage lifts the earth a distance equal to its thickness, which may be 4 or 5 inches, and then permits it to fall back, whereby the soil is loosened and broken up. This treatment conditions the soil for agricultural purposes, particularly for the growth of forage grasses, and creates a sub-surface water reservoir at a most desirable level.

The blades 66 or 74 function to clear paths for the traction devices of the vehicle. In the event a large tree with wide thick branches should become caught in the vehicle tunnel, or if it should be desirable for any other reason, the blades may be elevated by means of cylinders 73 or 80, respectively, to permit the traction devices 34 to encounter and crawl over the branches or other obstacle. The blades 66 are in the form of dozer blades, and adapted to dig or cut into the ground in their paths. For clearing some types of vegetation this cutting and scooping action is desirable, although it does necessitate the expenditure of some power. Where such dozing is not required, funnel guides of the character of blades 74 may be employed, adapted to ride the ground ahead of the traction devices on their wear plates 79, achieving substantially the same result with less power expenditure. The blades 74 may be held in relatively steady position by means of cylinder rods 83, or they may be permitted in normal operation to rise and fall freely with respect to the frames, with or without the cylinder rods, being guided and retained by the frame guide bars 77. Blades 74 largely carry their own weight, and permit some reduction in overall vehicle weight, size and complexity.

The sub-surface plow 116 is adapted by reason of its cross-sectional configuration to seek and follow its own level. Since it is desirable that the sub-surface plowing level be different for varying types of vegetation and other conditions of operation, provision is made for readily and simply altering the plowing level. By means of cylinders 135, the inner ends of the drag arms may be vertically adjusted, the openings 138 in the drag arm slide pads 134 being adapted to freely pivot on bearing portions 137 of the cylinder rods 136 to accommodate such adjustment. Vertical movement of the inner ends of the drag arms will effect a momentary inclination of the plow, which will cause it to seek and find a new level corresponding to the newly adjusted position of the drag arms, which level it will thereafter hold and follow until another adjustment is made. This construction permits the plow to remain always level with respect to the horizontal, no matter what the depth at which it travels. Provision is made, in the embodiment illustrated, for adjusting the plow for any level ranging from 0 to 3 feet below the surface.

A most advantageous feature of the vehicle in operating as a land clearing machine or otherwise is the pivotal flexibility thereof about the horizontal, transverse pivot member 47. The unique pivoting or swivelling action is illustrated in Figures 7 and 8 of the drawings, wherein the left-hand traction device is shown as mounting an obstruction such as stump 155. As there shown, in the event one tractor device encounters an elevated obstacle, it may climb up and onto such obstacle by tilting upwardly and raising only the forward part of one frame, thereby creating its own inclined plane instead of abruptly lifting one-half the total weight of the entire machine. Furthermore, throughout the rise and fall of the traction device in passing over an obstacle, the opposite traction device remains wholly in contact with the ground, whereby no loss of tractive engagement is suffered on that side. This pivoting or swivelling action between the frames permits the vehicle to "walk" over obstacles or ground surface irregularities of such nature as would stall a conventional vehicle of comparable size, weight and power, or would occasion such loss of traction as would prevent forward progress.

The side opposite to that passing over an obstruction is in the course of such passage tilted outwardly, but the frame design may be such as to permit such outward tilting without elevating the center of gravity of that frame, so that no weight need be lifted in tilting the low side. In the event that the outward tilting of the off frame occasions some lifting of weight, such weight is lifted gradually and smoothly as the pivot member tilts, over a time period delayed from and out of phase with the tilting and lifting of the side passing over the obstruction. This function is largely attributable to the position of pivot member 47, which is disposed at a level considerably above ground level and that of the traction devices. It will be clear that the higher the pivot member 47, the more pronounced will be the beneficial aspects of the walking action effected. Accordingly, the pivot member is disposed as high as feasible in the machine.

The mechanism associated with the machine frames is particularly designed to absorb and accommodate relative pivotal movement between the machine frames without loss of function. As apparent in Figures 7 and 8, relative pivotal movement of the frames will occasion lateral tilting of the pusher bar 103 and some offsetting of the structure constituted by pressure plates 107. Tilting of the pusher bar relative to its supporting booms 92 is permitted by the engagement between pins 98 and slots 99 in the pusher bar housing sleeves 97 (Figures 13 and 14). Vertical separation or offsetting between the inner edges of the pressure plates is accommodated by the slots 110 of their inner guide plates 108, which are engaged merely by pin 112.

The drag arm-plow mechanism is similarly designed and adapted to absorb and accommodate relative pivotal action between the frames. Slide pads 134 on the forward ends of the drag arms 123 are pivotally engaged to the bearing portions 137 of cylinder rods 136, whereby the drag arms may pivot freely about horizontal axes. The plow 116 being engaged to the drag arms by vertical pivots 122, longitudinal relative movement between the rear ends of the frames, as illustrated in Figure 7, occasions merely an angular deviation of the plow from the transverse, whereby one end of the plow travels slightly in advance of the other. Relative vertical displacement between the rear ends of the frames is accommodated partly by the pivotal action of the drag arms on the cylinder rod bearing portions 37, and partly by the inherent flexibility of the plow-standard construction. Such relative displacements, of course, occur gradually and progressively rather than instantaneously, and in the course of forward movement, so that accommodation thereof is smoothly accomplished. Should one frame run higher than the other for any appreciable distance, the plow will inherently assume a corresponding lateral tilt relative to the horizontal.

A further novel and advantageous action results from the plan configuration of the plow, and its attachment to the drag arms by vertical pivots. For one thing, all leading edges of the plow are inclined relative to the direction of travel, whereby they cut normally with a slicing action. In the event any portion of the plow leading edge encounters a resistance of unusually high order, such as might be afforded by a tap root of large diameter, the plow will tend to move laterally, thereby enhancing the slicing action. The lateral movement will continue until the object is severed or displaced, until it is cleared by an edge of the plow, or until it is engaged by the V of the plow leading edge intermediate the standards. In the latter case, maximum force is exertable against the object. Also, pronounced lateral movement of the plow will tend to turn the vehicle in proper direction to exert maximum direct force against the resistance occasioning the lateral movement. Lateral movement of the plow is permitted by reason of the vertical pivots joining it to the drag arms, enhanced by the loose fit of drag arm slide pads 134 within the frame openings 133 and the ability of the bearing portions 137 of rods 136 to pivot slightly about the vertical axes of cylinders 135. These same features also adapt the plow to follow the vehicle easily in curved paths, so that the vehicle may be turned in curves of reasonable radius without disturbing the plow function.

As will be apparent, the machine may be utilized for clearing some types of vegetation, such as low brush or the like, without the boom and pusher bar assembly. Similarly, for other types of vegetation such as dead or burned-over forest, the machine may be effective without the use of the drag arm-plow mechanism. For the usual case, however, the complete machine as shown and described is essential for effective operation.

Provision is made to rigidify and otherwise adapt the vehicle for mere transportation under its own power, for example across clear areas not to be worked. For this purpose, the plow may be brought to ground level by upward adjustment of the rods of hydraulic cylinders 135 while the machine is yet in motion, whereupon the plow may then be elevated to and held in inoperative transport position by means of cylinders 142. The blades 66 or 74 may be elevated out of ground contact by their cylinders 73 or 80, and the frames 30 locked rigidly together by means of draw members 150. For this purpose, the draw members are positioned within or adjacent the larger of the conical housings 145, and their joint members 152 are engaged by bolts 153 to the corresponding joint members 149 of the transverse cylinder rods 148, then in extended position. Thereupon, hydraulic cylinders 146 may be actuated to effect retraction of their rods 148, drawing the draw members through the conical housings 145 of the respective frames and causing them to align the frames in parallelism. Continued pressure on the draw members will thereafter maintain the frames locked together, whereupon the vehicle may operate as a rigid unit, and at relatively high speed. Upon reaching the destination where clearing operations are to be resumed, the draw members may be released from the conical housings 145 and detached from cylinder rods 148, the blades and plow lowered to operative position, and clearing operations resumed as before. Rigidification of the vehicle for transport and re-establishment of operative condition as outlined above can be accomplished conveniently and quickly, within a matter of a few minutes.

Another outstanding feature of the invention is the capability of the vehicle to be readily and quickly disassembled into two longitudinal halves or sections, and as readily reassembled into an operative device. Rigidified as described above by means of draw members 150 and with blades and plow elevated, the vehicle may be maneuvered into position to the rear of two low-slung platform trailers 156 parked side by side. The machine may be partially disassembled by removal of the plow and drag arms, and by removal of pusher bar 103. The plow is detached from the drag arms by merely unbolting and removing the arc supports 126 and 127. The drag arms may be detached by removing nuts 139 from the bearing portions 137 of cylinder rods 136, and then withdrawing the bearing portions through the openings 138 of the drag arms. To detach the pusher bar, bolts 102 are removed to separate housings 96 and 100. The pusher bar with its knife edge is thus removed, and the housings 100 and their bolts 102 may be replaced on housings 96 for convenient stowage. If the vehicle is provided with dozer blades 66, these may be lowered to bottom position as determined by suitable stops, and then detached from arms 68 by removal of pins 67. The blades may thereupon be pivoted inwardly on their carriers 70, to a final transport position underneath and inside the tunnel 33, as indicated in Figures 10 and 11.

Suitable inclined structure (not shown) being positioned to the rear of the adjoining trailer 156, the vehicle may now be driven up onto the trailers under its own power. The booms 92 and pressure plates 107 will extend forwardly over the cabs of the trailer tractors 157, and may be lowered to rest position on the tops of the cabs, suitable supports therefor being provided if desired. Inside the tunnel of the vehicle, jacks 158 may be positioned below the horizontal portion 31 of each frame, and extended to partially assume the weight thereof. The jacks 158 may be permanently mounted on the trailers. As shown in Figure 11, two jacks are adequate for each frame. Separation of the frames may then proceed by unbolting cap members 58 and 64 from the arc supports 54 and 62 respectively, and the pivot member 47 may be released by unbolting the bearing brackets 49. The pin 112 may be removed to release the pressure plates from sliding engagement, and the pressure of the draw members may be released by extension of the rods 148 of cylinders 146, and the draw members may then be removed by disassembly of the joints constituted by members 149 and 152. Finally, controls and hydraulic lines may be parted by suitable conventional disconnect means. In this manner, the respective frames of the machine are entirely separated, and the vehicle is longitudinally split into distinct sections. The entire operation may be completed by an experienced crew in a matter of two or three hours. The plow, drag arms, pusher bar, cap members, pivot member and lesser removed elements may be loaded onto the trailers underneath the tunnel portions of the frames as indicated in Figures 10 and 12. If more convenient, the plow, drag arms and pusher bar may be loaded in proper position on the trailers before the vehicle is driven thereonto.

So loaded, each tractor-trailer may convey one frame or section of the vehicle to a new location. As will be evident in Figures 10 to 12, the trailers so loaded will conform with most State requirements as to overall length, height, width and weight. If the device incorporates blades of the type exemplified in Figures 24 to 28, these may be rested on the trailer deck in normal position. These blades do not project forwardly from the frame sufficiently to require folding in the manner of the blades 66 illustrated, but may remain in place extending slightly to one side of the trailer yokes 159.

When the loaded tractor-trailers arrive at their destination, they may be driven to side-by-side position, to bring the frames into rough alignment and substantial adjacency. Thereupon the hydraulic lines and controls may be connected, and the power units 35 started to furnish hydraulic pressure. The draw members 150 may then be positioned within or adjacent the larger of the frame tapered housings 145, and connected to the rods 148 of hydraulic cylinders 146 by means of the flexible joints 149—152. The hydraulic cylinders 146 may then be actuated to pull the draw members through the housings 145, whereby the frames will be forcibly brought into proper alignment and adjacency. The longitudinal sections or frames may be assembled in this manner, even though one foot out of longitudinal alignment and separated transversely by a distance up to and including eighteen inches.

With the draw members maintaining the frames together, the jacks 158 may be released, and the pivot member 47 placed in its bearing wells 48 and secured therein by means of bearing brackets 49. The cap members 58 and 64 may be bolted in place about the arc supports 54 and 62, and pin 112 may be replaced in the slots 110 of the pressure plate guide plates 108. Ramps or other suitable inclined structure being again emplaced to the rear of the trailers, the vehicle may dismount under its own power. The pusher bar, plow and drag arms may then be attached as previously described, and the vehicle may be readied for clearing operations by releasing and removing the draw members 150. Alternatively, the vehicle may travel under its own power to a desired starting point for further operations prior to the release and removal of the draw members, in rigid manner as previously described. The assembly operation is as readily and quickly accomplished as is disassembly, and requires only a comparably short period of time.

As will be evident, the vehicle of the invention may be adapted for purposes other than land clearing. The vehicle may be employed, for example, as a heavy-duty tractor or carriage, as a ditching machine or the like.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:

1. A traction vehicle comprising two frames disposed side by side, an underlying traction device supporting each frame, a transverse pivot member disposed across said frames at a level substantially coincident with the upper surfaces of said frames and considerably above said traction devices, and means for engaging said frames for relative pivotal movement about the axis of said pivot members.

2. A traction vehicle comprising two frames disposed side by side, an underlying traction device supporting each frame adjacent the outer side thereof, a transverse pivot member disposed across said frames at a level substantially coincident with the upper surfaces of said frames and considerably above said traction devices, and means for detachably engaging said frames for relative pivotal movement about the axis of said pivot member.

3. A traction vehicle comprising two frames disposed side by side, an underlying traction device supporting each frame, a power unit on each frame substantially above the traction device thereof, a transverse pivot member disposed across said frames at a level substantially coincident with the upper surfaces of said frames and considerably above said traction devices, and means for engaging said frames for relative pivotal movement about the axis of said pivot member.

4. A traction vehicle comprising two frames disposed side by side, an underlying traction device supporting each frame adjacent the outer side thereof, a power unit on each frame substantially above the traction device thereof, power transmission means engaging the power unit on each frame to the traction device thereof, a transverse pivot member disposed across said frames at a level substantially coincident with the upper surfaces of said frames and considerably above said traction devices, and means for detachably engaging said frames for relative pivotal movement about the axis of said pivot member.

5. A traction vehicle comprising two frames disposed side by side, an underlying traction device supporting each frame, a transverse pivot member disposed across said frames at a level substantially coincident with the upper surfaces of said frames and considerably above said traction devices, an arc support mounted on each frame about the axis of said pivot member, and means for engaging said arc supports for relative pivotal movement about the axis of said pivot member.

6. A traction vehicle comprising two frames disposed side by side, an underlying traction device supporting each frame, a transverse pivot member disposed across said frames at a level substantially coincident with the upper surfaces of said frames and considerably above said traction devices, a plurality of arc supports mounted on each frame about the axis of said pivot member, one of said arc supports being disposed adjacent the front of said frame, and means for detachably engaging corresponding pairs of said arc supports for relative pivotal movement about the axis of said pivot member.

7. A traction vehicle comprising two frames disposed side by side, a traction device supporting each frame, a transverse pivot member disposed across said frames above said traction devices, an arc support mounted on each frame about the axis of said pivot member, an arcuate cap member enclosing the peripheral portions of said arc supports, means for engaging said cap member to one of said arc supports, and means for retaining said cap member in sliding contact with the other of said arc supports for relative pivotal movement about the axis of said pivot member.

8. A traction vehicle comprising two frames adapted for side by side disposition, a traction device supporting each frame, means for detachably engaging said frames for relative pivotal movement about a transverse axis, tapered housings correspondingly positioned at the inside of each frame, a tapered draw member adapted to fit closely within said housings when aligned in adjacency, and transversely acting power means mounted on one frame in general alignment with said housings, said power means being engageable to the smaller end of said draw member whereby said draw member may be pulled through said housings to align and draw said frames together.

9. A traction vehicle comprising two frames adapted for side by side disposition, a traction device supporting each frame, a pivot member adapted for transverse disposition across said frames above said traction devices, means for detachably engaging said frames for relative pivotal movement about the axis of said pivot member, conical housings correspondingly positioned at the inside of each frame, a conical draw member adapted to fit closely within said housings when aligned in adjacency, a transversely disposed hydraulic cylinder mounted on one frame in alignment with and adjacent the smaller of said housings, and means for engaging said hydraulic cylinder to the smaller end of said draw member whereby said draw member may be pulled through said housings to align and draw said frames together.

10. A traction vehicle comprising two frames disposed side by side, an underlying traction device supporting each frame, a transverse pivot member disposed across said frames at a level substantially coincident with the upper surfaces of said frames and considerably above said traction devices, means for engaging said frames for relative pivotal movement about the axis of said pivot member, a boom mounted on each frame on a transverse pivot axis and extending forwardly therefrom, said transverse boom axis being spaced from the axis of said pivot member, a transverse pusher bar flexibly joining the outer ends of said booms, and means for pivoting said booms about said transverse boom axis.

11. A traction vehicle comprising two frames disposed side by side, a traction device supporting each frame, a transverse pivot member disposed across said frames above said traction devices, means for engaging said frames for relative pivotal movement about the axis of said pivot member, a boom mounted on each frame on a transverse pivot axis and extending forwardly therefrom, said transverse boom axis being longitudinally spaced from the axis of said pivot member, a transverse pusher bar flexibly joining the outer ends of said booms, a pressure plate extending inwardly from each of said booms, means slidably engaging the inner sides of said pressure plates to permit limited relative displacement therebetween, and means for pivoting said booms about said transverse boom axis.

12. A traction vehicle comprising two frames disposed side by side, a traction device supporting each frame, a transverse pivot member disposed across said frames above said traction devices, means for engaging said frames for relative pivotal movement about the axis of said pivot member, a boom mounted on each frame on a transverse pivot axis and extending forwardly therefrom, said transverse boom axis being longitudinally spaced from the axis of said pivot member, a transverse pusher bar flexibly joining the outer ends of said booms, a pressure plate extending inwardly from each of said booms, a guide extending vertically from the inner side of each of said pressure plates, said guides being slotted in direction normal to said pressure plates, retaining means engaging the slots of said guides to permit limited relative displacement therebetween in the direction of said slots, and means for pivoting said booms about said transverse boom axis.

13. A traction vehicle comprising two generally horizontal frames disposed side by side, each of said frames including a longitudinally extended and generally vertical portion extending downwardly therefrom, whereby said frames define a tunnel-like passage therebetween, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, and an inwardly inclined blade mounted on the front of each frame in the path of the traction device thereof.

14. A traction vehicle comprising two generally horizontal frames disposed side by side, each of said frames including a longitudinally extended and generally vertical portion extending downwardly therefrom, whereby said frames define a tunnel-like passage therebetween, an underlying traction device supporting each frame outside the vertical portion thereof, a transverse pivot member disposed across said frames at a level substantially coincident with the upper surfaces of said frames and considerably above said traction devices, means for detachably engaging said frames for relative pivotal movement about the axis of said pivot member, an inwardly inclined blade slidably mounted on the front of each frame in the path of the traction device thereof, and means on each frame for elevating the blade thereof relative to the frame.

15. A traction vehicle comprising two generally horizontal frames disposed side by side, each of said frames including a longitudinally extended and generally vertical portion extending downwardly therefrom, whereby said frames define a tunnel-like passage therebetween, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, an inwardly inclined blade slidably mounted on the front of each frame in the path of the traction device thereof, the bottom of each blade being adapted for sliding movement over the ground, and means on each frame for substantially vertically elevating the blade thereof relative to the frame.

16. A traction vehicle comprising two generally horizontal frames disposed side by side, each of said frames including a longitudinally extended and generally vertical portion extending downwardly therefrom, whereby said frames define a tunnel-like passage therebetween, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, an inwardly inclined blade mounted on the front of each frame in the path of the traction device thereof, and means for pivotally moving each of said blades to inoperative transport position within said tunnel-like passage.

17. A traction vehicle comprising two frames disposed side by side, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, an inwardly inclined blade slidably mounted on the front of each frame in the path of the traction device thereof, and means on each frame for elevating the blade thereof relative to the frame.

18. A traction vehicle comprising two frames disposed side by side, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, an arm pivotally mounted on the outer side of each traction device on a transverse axis and extending forwardly therefrom, an inwardly inclined blade detachably engaged to the forward end of each of said arms, means for pivoting said arms and blades about the transverse arm axis, and means for pivotally moving each of said blades to inoperative transport position inside and below the associated frame.

19. A traction vehicle comprising two frames disposed side by side, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, an arm pivotally mounted on the outer side of each traction device on a transverse axis and extending forwardly therefrom, an arcuate guide concentric with the pivotal axis of said arm mounted on the front of each frame, a carrier slidably engaged to each of said guides, an inwardly inclined blade detachably engaged to the forward end of each of said arms and pivotally engaged on a vertical axis to the corresponding carrier, and means for pivoting said arms and blades about the transverse arm axis, said blades when detached from said arms being pivotally movable on said carriers to inoperative transport position inside and below the respective frames.

20. A traction vehicle comprising two frames disposed side by side, an underlying traction device supporting each frame, a transverse pivot member disposed across said frames at a level substantially coincident with the upper surfaces of said frames and considerably above said traction devices, means for detachably engaging said frames for relative pivotal movement about the axis of said pivot member, a boom mounted on each frame on a transverse pivot axis and extending forwardly therefrom, a transverse pusher bar flexibly joining the outer ends of said booms, means for pivoting said booms about said transverse boom axis, an inwardly inclined blade slidably mounted on the front of each frame in the path of the traction device thereof, and means on each frame for elevating the blade thereof relative to the frame.

21. A traction vehicle comprising two frames disposed side by side, an underlying traction device supporting each frame, a transverse pivot member disposed across said frames at a level substantially coincident with the upper surfaces of said frames and considerably above said traction devices, means for engaging said frames for relative pivotal movement about the axis of said pivot member, a drag arm pivotally engaged to each frame by a transverse pivot and extending rearwardly therefrom, and a sub-surface plow pivotally engaged to said drag arms by vertical pivots.

22. A traction vehicle comprising two frames disposed side by side, a traction device supporting each frame, a transverse pivot member disposed across said frames above said traction devices, means for engaging said frames for relative pivotal movement about the axis of said pivot member, a drag arm pivotally engaged to each frame by a transverse pivot and extending rearwardly therefrom, means for vertically adjusting said drag arm pivots with respect to said frames, and a sub-surface plow pivotally engaged to said drag arms by vertical pivots.

23. A traction vehicle comprising two frames disposed side by side, a traction device supporting each frame, a transverse pivot member disposed across said frames above said traction devices, means for engaging said frames for relative pivotal movement about the axis of said pivot member, a vertical guide associated with the rear of each frame, a transverse pivot slidably engaged to each guide, a drag arm engaged to each transverse pivot and extending rearwardly therefrom, a sub-surface plow pivotally engaged to said drag arms by vertical pivots, said plow being adapted to seek its own sub-surface level, and means on each frame for vertically adjusting the associated transverse pivot, whereby the sub-surface level of said plow may be established in accordance with the adjusted position of said transverse pivots.

24. A traction vehicle as defined in claim 23, including power means operative on said drag arms and said frames to pivotally elevate said plow to inoperative transport position.

25. A traction vehicle comprising two frames disposed side by side, a traction device supporting each frame, a transverse pivot member disposed across said frames above said traction devices, means for engaging said frames for relative pivotal movement about the axis of said pivot member, a drag arm pivotally engaged to each frame by a transverse pivot and extending rearwardly therefrom, means for vertically adjusting said drag arm pivots with respect to said frames, a sub-surface plow, laterally spaced standards projecting upwardly from said plow, the leading edge of said plow being rearwardly inclined on both sides of each standard, and vertical pivots engaging said plow standards to said drag arms.

26. A traction vehicle comprising a frame, a pair of traction devices supporting said frame, a pair of laterally spaced drag arms pivotally and flexibly engaged to said frame by transverse pivots and extending rearwardly therefrom, a flexible sub-surface plow of width exceeding that of said vehicle, laterally spaced standards projecting upwardly from said plow inside the ends thereof, the leading edge of said plow being rearwardly inclined on both sides of each standard, and vertical pivots engaging said plow standards to said drag arms.

27. A traction vehicle comprising two frames disposed side by side, a traction device supporting each frame, a transverse pivot member disposed across said frames above said traction devices, means for engaging said frames for relative pivotal movement about the axis of said pivot member, a drag arm pivotally engaged to each frame by a transverse pivot and extending rearwardly therefrom, means for vertically adjusting said drag arm pivots with respect to said frames, a sub-surface plow of flexible box truss construction, laterally spaced standards projecting upwardly from said plow, the leading edges of said plow and standards being sharp and beveled, the leading edge of said plow being rearwardly inclined on both sides of each standard, and vertical pivots engaging said plow standards to said drag arms.

28. A sub-surface plow of flexible box truss construction, laterally spaced standards projecting upwardly from said plow, the leading edges of said plow and standards being sharp and beveled, the leading edge of said plow being rearwardly inclined on both sides of each standard, and vertical pivot means at the top of each standard for pivotal attachment to a traction vehicle.

29. A traction vehicle comprising two generally horizontal frames disposed side by side, each of said frames including a longitudinally extended and generally vertical portion extending downwardly therefrom, whereby said frames define a tunnel-like passage therebetween, a traction device supporting each frame, a transverse pivot member disposed across said frames above said traction devices, means for engaging said frames for relative pivotal movement about the axis of said pivot member, a boom mounted on each frame on a transverse pivot axis and extending forwardly therefrom, a transverse pusher bar joining the outer ends of said booms, means for pivoting said booms about said transverse boom axis, an inwardly inclined blade slidably mounted on the front of each frame in the path of the traction device thereof, means on each frame for elevating the blade thereof relative to the frame, a drag arm pivotally engaged to each frame by a transverse pivot and extending rearwardly therefrom, and a sub-surface plow pivotally engaged to said drag arms by vertical pivots.

References Cited in the file of this patent

UNITED STATES PATENTS

| Number | Name | Date |
|---|---|---|
| Re. 22,613 | Paulsen | Mar. 6, 1945 |
| 780,034 | Heusner et al. | Jan. 17, 1905 |
| 1,004,238 | Brooks | Sept. 26, 1911 |
| 1,430,251 | Parker | Sept. 26, 1922 |
| 1,865,133 | Osman | June 28, 1932 |
| 1,953,563 | Martinage | Apr. 5, 1934 |
| 2,047,310 | Cohea et al. | July 14, 1936 |
| 2,080,888 | Hintz | May 3, 1937 |
| 2,108,466 | Allin et al. | Feb. 15, 1938 |
| 2,140,712 | Mitchell | Dec. 20, 1938 |
| 2,173,406 | Wilkinson | Sept. 19, 1939 |
| 2,185,179 | Bird et al. | Jan. 2, 1940 |
| 2,282,389 | Argo | May 12, 1942 |
| 2,292,904 | Shollenberger | Aug. 11, 1942 |
| 2,402,352 | Taylor | June 18, 1946 |
| 2,488,767 | Drott et al. | Nov. 22, 1949 |
| 2,495,057 | Dillingham | Jan. 17, 1950 |
| 2,551,231 | Anderson | May 1, 1951 |
| 2,557,853 | Zang | June 19, 1951 |
| 2,584,485 | McNeal | Feb. 5, 1952 |
| 2,655,089 | LeTourneau | Oct. 13, 1953 |
| 2,678,105 | Peterson | May 11, 1954 |